US009383203B2

(12) United States Patent
Dove

(10) Patent No.: US 9,383,203 B2
(45) Date of Patent: Jul. 5, 2016

(54) GEOLOCATION USING HIGH ORDER STATISTICS

(71) Applicant: BAE Systems Information and Electronic Systems Integration Inc., Nashua, NH (US)

(72) Inventor: Webster Dove, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 13 days.

(21) Appl. No.: 14/107,215

(22) Filed: Dec. 16, 2013

(65) Prior Publication Data

US 2014/0107970 A1    Apr. 17, 2014

Related U.S. Application Data

(63) Continuation of application No. 12/762,627, filed on Apr. 19, 2010, now Pat. No. 8,612,178, which is a continuation-in-part of application No. 11/436,422, filed on May 18, 2006, now abandoned.

(60) Provisional application No. 60/682,141, filed on May 18, 2005.

(51) Int. Cl.
| G01C 15/00 | (2006.01) |
| G01S 5/02 | (2010.01) |
| G06F 17/18 | (2006.01) |

(52) U.S. Cl.
CPC ............... G01C 15/00 (2013.01); G01S 5/0252 (2013.01)

(58) Field of Classification Search
CPC ......... G01C 15/00; G01S 5/0252; G01S 5/02; G01S 5/2005; G01S 13/02; H04B 17/309; H04B 7/08
See application file for complete search history.

(56) References Cited

U.S. PATENT DOCUMENTS

| 6,850,735 B2 * | 2/2005 | Sugar et al. ................ 455/67.11 |
| 6,993,440 B2 * | 1/2006 | Anderson et al. ............... 702/66 |

* cited by examiner

*Primary Examiner* — Manuel L Barbee
(74) *Attorney, Agent, or Firm* — Bourque & Associates; Daniel J. Long

(57) ABSTRACT

A specific emitter identification (SEI) method and apparatus is capable of identifying and tracking objects within a geographical area of interest wherein the system and method has not been preprogrammed to look for particular signals. The system and method receives all of the emitted electromagnetic signals emitted from area of interest. The system and method next performs high order statistical analysis on the received signals and determines which signals emanate from possible targets of interest and which likely emanate from background clutter/noise by comparing the relative degrees of Gaussianness of the signals (for example using entropy measurements). The least Gaussian signals are deemed to likely be signals from potential targets of interest while those which are more Gaussian are deemed to be likely from background clutter or noise.

15 Claims, 3 Drawing Sheets

GEOLOCATION USING HIGH ORDER STATISTICS

RELATED APPLICATIONS

This application is a continuation of U.S. patent application Ser. No. 12/762,627 filed Apr. 19, 2010 entitled Geolocation Using High Order Statistics which in turn is a continuation-in-part of U.S. patent application Ser. No. 11/436,422 filed May 18, 2006 entitled Geolocation Using Entropy Measurements which in turn is related to and claims priority from U.S. provisional Application No. 60/682,141 filed May 18, 2005 entitled Geolocation Using Entropy Measurements which is incorporated fully herein by reference.

TECHNICAL FIELD

The present invention relates to identification and tracking of objects and more particularly, relates to a method and apparatus for applying high order statistics to previously unknown/undetermined emissions to identify and/or track objects of interest within a predetermined geographical area.

BACKGROUND INFORMATION

Essentially all objects emit or radiate energy. Electromagnetic (EM) spectrum is a name often given to a number of types of radiation as a group. Radiation is energy that travels and spreads out as it travels away from the source; visible light that comes from a lamp and radio waves that come from a radio station are two types of electromagnetic radiation. Other examples of EM radiation are microwaves, infrared and ultraviolet light, X-rays and gamma-rays. Hotter, more energetic objects and events create higher energy radiation than cool objects.

Natural objects radiate EM energy that can be classified as Gaussian, while man-made objects radiate EM energy that is non-Gaussian. Gaussian energy can be defined as normally distributed (with a bell-shaped curve) and having a mean at the center of the curve with tail widths proportional to the standard.

It is well known that these EM energy signals can be collected using a receiver and used for identification and tracking purposes. This process is generally referred to as Specific Emitter identification (SEI). Specific Emitter Identification is a method of recognizing individual electronic emitters through the precise measurement of selected signal externals (parameters and/or characteristics). In order to be identified by SEI techniques, a specific emitter must have one or more of these signal externals that are stable and that are unique within the measurement capabilities of most collectors. SEI can provide reliable and timely intelligence data for keeping track of individual target emitters and the particular units operating them.

Known SEI methods are generally based on the concept of identifying one or more characteristic radio signals that are unique to specific electrical devices used on or by objects of interest, and which can then be used to identify and track the objects having these devices. This prior art method requires a "library" or "database" of signals unique to specific electrical devices on objects of interest and which are compared against using the received signal to identify the object of interest. The characteristic signal of the object of interest must be stable and unique within the measurement capabilities of the collector/receiver. For example, a library or database may be developed of signals for specific devices that are to be identified and tracked such as missiles, aircraft, tanks or the like.

One of the problems associated with the known SEI methods is that objects often emit a wide range of radio signals, much of which cannot be used for identification purposes. Additionally, and most importantly, there are often many other objects in the area of interest that are also emitting radio signals or other EM energy that are generally collectively referred to as "background clutter" or "noise". These "background clutter" or "noise" tend to mask or hide the signals of the objects of interest and make it difficult to identify and distinguish the object(s) of interest from the background clutter. Many of these "background clutter" or "noise" signals emanate from natural objects and not man-made objects and therefore, are not of interest.

Because of wide range of radio signals or other EM energy that are emitted, known SEI methods look for one or more specific signal which can be correlated to a particular known object, for example, a characteristic signal corresponding to a specific type of jet aircraft, missile, tank or the like. Unfortunately, the particular signal to be received and analyzed must be determined ahead of time in order for the known SEI methods to work. Such signals must be stored in a table, library, database or other reference source against which the received signal is compared for identification purposes. If the system/method does not know what signal to look for or cannot find a "match" in the reference library or database, then it will not be able to identify and/or track the object. Since the known SEI methods are limited to a specific signals, they are also not capable of simultaneously tracking/identifying multiple types of different objects.

Known SEI methods generally involve the use of two or more radio signal receiving platforms moving in different directions (preferably in generally perpendicular directions) along a geographical area of interest. As these radio signal receiving platforms move or pan for signals across the geographical, area of interest, they form a grid having a plurality of quadrants or tiles.

According to the known SEI methods, these radio signal receiving platforms analyze a single, specific radio signal known to be indicative of specific targets (such s a personal transport, battle ship, an aircraft, troops, or the like), commonly referred to as a characteristic signal. Unfortunately, these methods are limited in that the methods can only detect objects that have been preprogrammed to look for; i.e., the method can only receive and analyze a specific signal that is characteristic of an object. Thus, if an object (for example, a particular type of tank or the like) is in the geological area of interest, and the characteristic signal for that particular tank has not be preprogrammed (in a database, table or the like) to be searched for, the known SEI methods will not detect the tank. Consequently, the tank may be allowed to move about within the geological area of interest undetected thereby significantly reducing the level of safety.

Accordingly, what is needed is an apparatus and/or method of identifying and/or tracking a wide range of objects within a geographic area of interest. The apparatus/method should not be limited to scanning for specific known or predetermined signals. Additionally, the apparatus/method should not need to previously know what emitter signal or signals to look for. The apparatus/method should also be capable of simultaneously tracking a number of multiple different types of objects.

SUMMARY

The present invention features a Specific Emitter Identification (SEI) method and apparatus that is capable of identifying and tracking one or more objects of interest within a geological area of interest wherein the system/method has not be preprogrammed to look for particular or predetermined objects.

The system and method of the present invention simultaneously receives all of the radio or other electromagnetic energy signals from an area of interest. According to the preferred embodiment, the system and method of the present invention preferably divides the geographical area of interest into a plurality of "tiles" or quadrants. Each tile is then preferably scanned individually for all the signals that are present regardless of their source.

The system and method next analyzes the received signals and determines which signals are possible characteristic signals of objects of interest and which signals are likely to be background clutter or noise. According to the preferred embodiment, this is accomplished by determining the relative degree of structure or complexity of the signals. In the exemplary embodiment, this determination is done by applying high order statistics, such as entropy measurements, to classify the signals as to how Gaussian (or non-Gaussian) they are. The more non-Gaussian the signal is (or the less Gaussian the signal is), the more likely it is man-made and thus, a signal of interest, while the more Gaussian a received signal is, the more likely it emanates from a natural object and therefore not a signal of interest. The signals determined, to be more structured (non or less Gaussian) are deemed to be potential characteristic signals of interest.

It is important to note that the present invention is not intended to be limited to a device or method which must satisfy one or more of any stated or implied objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention, will be better understood by reading the following detailed description, taken together with the drawings wherein.

DETAILED DESCRIPTION OF THE PREFERRED EMBODIMENTS

Figure 1:
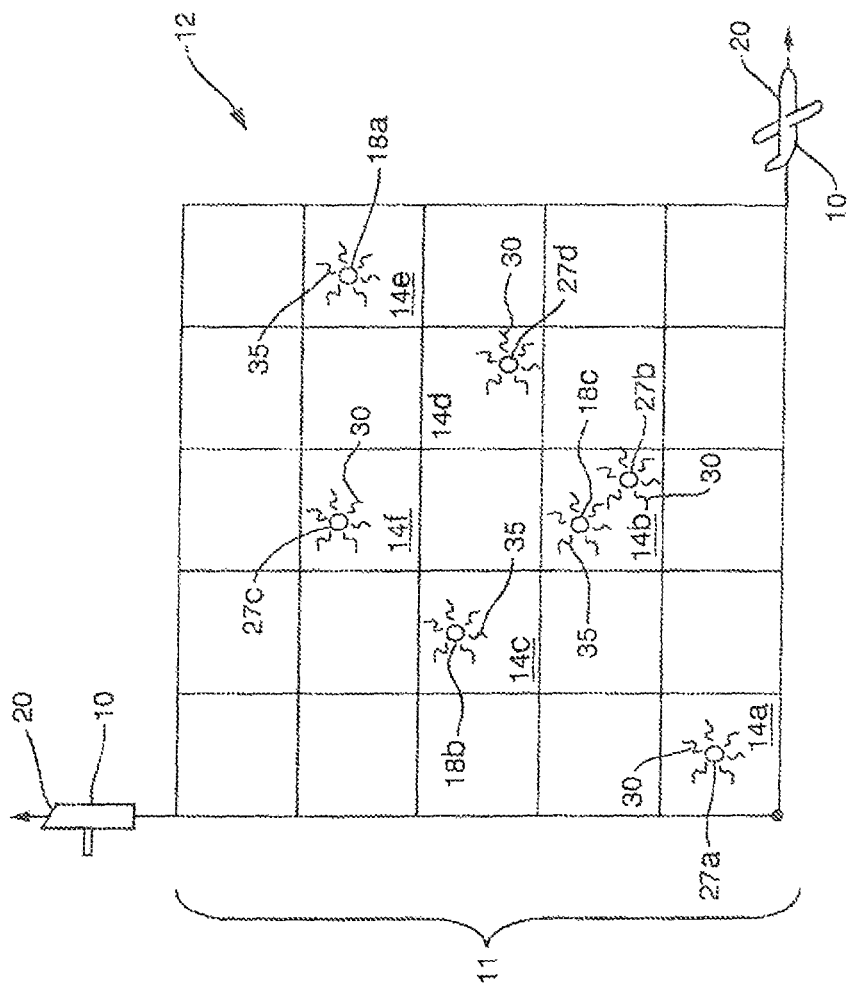
FIG. 1 is schematic representation of one embodiment of the implementation of the present invention shown with a geographic area of interest.
Figure 2:
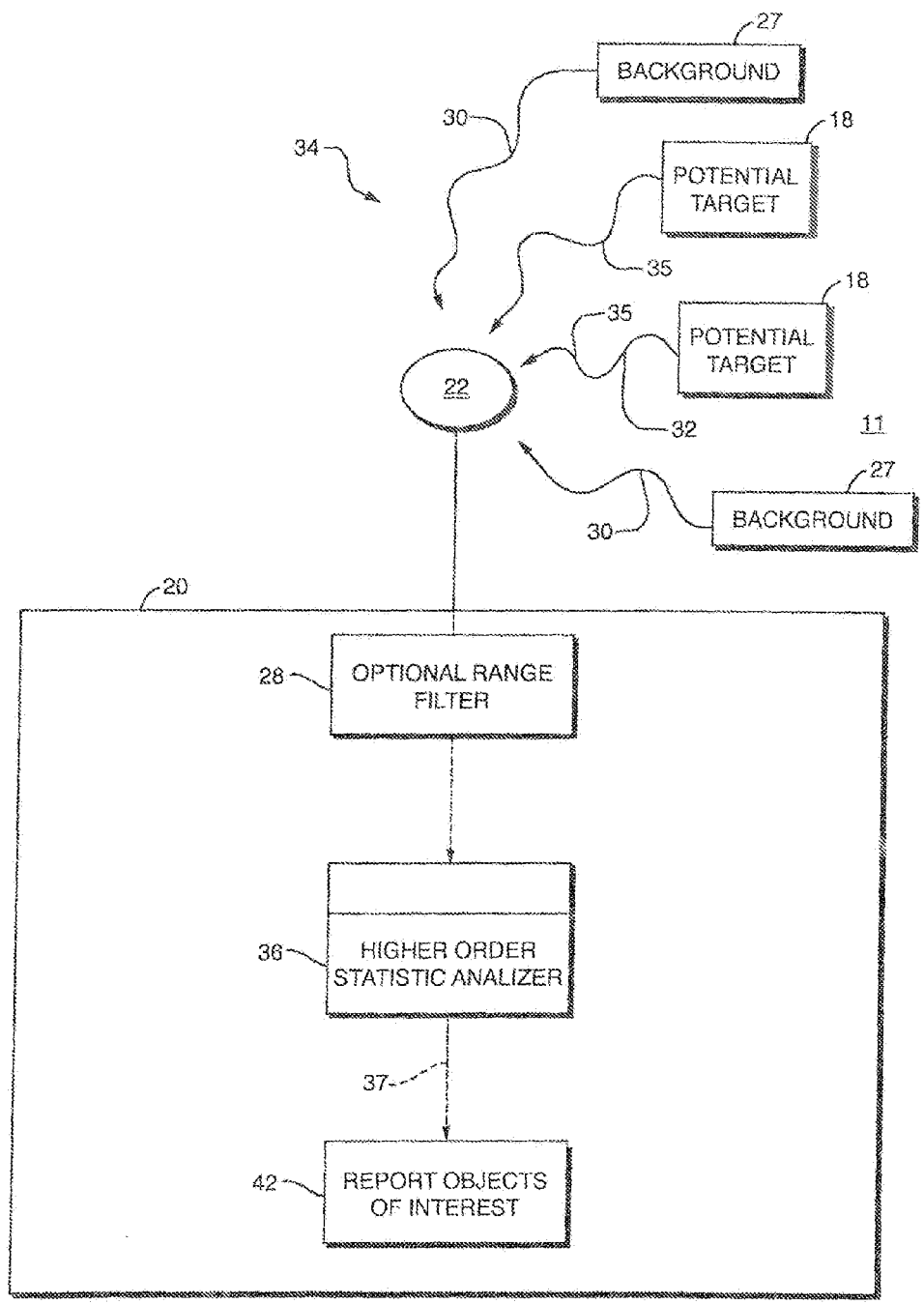
FIG. 2 is a schematic view of one embodiment of the system according to the present invention.

Accordingly, rather than pick a single signal, the SEI system 20, FIGS. 1 and 2, according to the present invention, simultaneously scans for all or at least a plurality of EM energy signals emitted from potential targets of interest 18 within the geographic area of interest 11, as will be explained in greater detail below. The system 20 includes a receiving device 22, including an antenna and other associated electronics as well known in the art, for simultaneously collectively receiving substantially all of the EM energy signals 34 emitted within the geographic area of interest 11 and including EM energy signals 35 radiating from man-made potential targets of interest 18 and background or white noise 30 from natural objects 27.

All of the EM energy signals 34 emitted within the geographic area of interest 11 are typically received and gathered. All of the received signals 34 can be examined or alternatively, a range of signals of interest can be predetermined and filtered out using filter 28, and thereby only those signals falling within that range will be further examined. The chosen range of signals of interest is preferably wide enough such that additional, yet unknown characteristic signals may also be received and analyzed.

Figure 3:
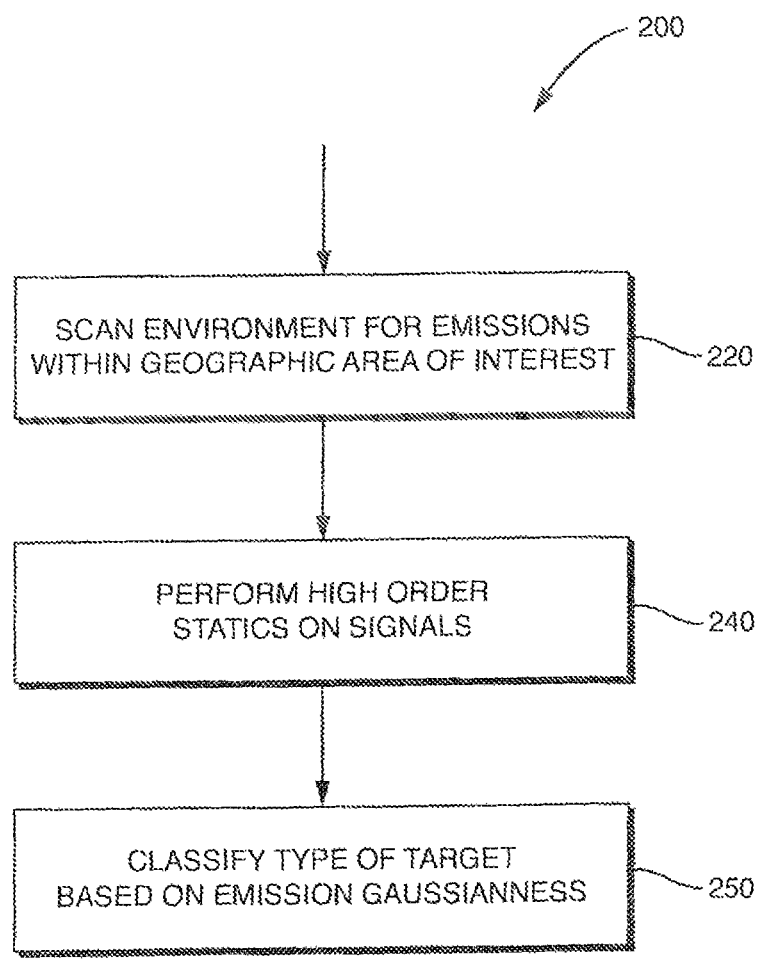
FIG. 3 is a flow chart of one embodiment of the method according to the present invention.

One or more EM or radio signal receiving platforms 10 are used to scan a geographical area of interest 11, (act 220, FIG. 3). Before, during or after scanning an area of interest for signals, the radio signal receiving platforms 10 or the system 20 preferably partition the geographical area of interest 11 into a plurality of tiles or sections 14 (FIG. 1) having a predetermined size. Partitioning the geographical area of interest 11 into tiles 14 aids the system in locating, identifying and tracking the individual object of interest. Since the radio signal receiving platforms 10 will receive all signals 35 within the geographic area of interest 11 or within a given tile 14, there will likely be a lot of background noise or clutter signals 30 in addition to signals of interest 35.

For example, the system 20 may detect signals 35 from a potential object of interest 18a, 18b and 18c in tiles 14e, 14c and 14b respectively, while also detecting background noise or clutter 30 within tiles 14a, 14b, 14f and 14d from some natural objects 27a-27d respectively.

The present invention solves the problem of identifying only predetermined signals 35 from potential targets of interest 18 by performing high order statistical analysis on all the received signals 34 (act 240, FIG. 3). Performing higher order statistical analysis on the received signals allows the system 22 determine which of the received signals (collectively 34) are most Gaussian (thereby most likely signals from natural objects/background noise not of interest) and those that are most non-Gaussian or less Gaussian (and most likely signals from man-made objects likely of great interest) using one or more well known statistical analysis techniques, such as entropy, using a statistical analyzer 36 preferably implemented as one or more software programs.

Entropy measurements/calculations are well understood and known by those skilled in the art, and are but one exemplary entropy, using a statistical analyzer 36 preferably implemented as one or more software programs.

Entropy measurements/calculations are well understood and known by those skilled in the art, and are but one exemplary method of applying high order statistics to the received signals and to therefore calculate whether each received signal is Gaussian or non-Gaussian or more or less Gaussian. Once the entropy or other type of higher order statistics analysis is performed for each received signal, act 240, the entropy measurements for each signal are then either compared to each other or compared to some baseline Gaussian determination "level" in order to determine which signals are most non-Gaussian (less Gaussian) signals of possible interest from possible objects of interest) and which are Gaussian or most Gaussian (i.e., background noise or clutter).

Once all of the received signals 34 have been analyzed for their level of Gaussianness by the high order statistics analyzer 36, the resulting signals of possible interest which are non-Gaussian or the least Gaussian, are deemed to be potential "targets of interest" 18, act 250

Once the object 18 has been identified as an object or target of interest, the object of interest's location within the geological area of interest 11 can be determined according to which tile 14 the object of interest is located in. Thus, by comparing the position of the object of interest in subsequent scanning for received signals 34, it is also possible to track the object of interest within the geographical area of interest 11.

As mentioned above, the present invention is not intended to be limited to a device or method which must satisfy one or more of any stated or implied objects or features of the invention and should not be limited to the preferred, exemplary, or primary embodiment(s) described herein. Modifications and substitutions by one of ordinary skill in the art are considered to be within the scope of the present invention, which is not to be limited except by the following claims.

The invention claimed is:

1. A method of identifying a location of one or more objects of interest amongst a plurality of objects located within a geographical area of interest, said method comprising the steps of:
    scanning the geographical area of interest by at least one receiving device having an antenna for detecting all or a plurality of electromagnetic energy signal emissions being emitted by the plurality of objects;
    performing a high order statistical analysis by a statistical analyzer on said detected electromagnetic energy signal emissions, wherein said high order statistical analysis is configured for determining a Gaussian level of each said electromagnetic energy signal emissions;
    identifying one or more objects amongst the plurality of objects as an object of interest based on the determined Gaussian level, wherein the objects having a Gaussian level lower than a Gaussian determination level are identified as objects of interest; and
    determining locations of the one or more objects of interest based on the one or more objects having a Gaussian level lower than the Gaussian determination level.

2. The method of claim 1, wherein the step of performing a high order statistical analysis comprises measuring the entropy for the electromagnetic energy signal emissions emitted by the plurality of objects.

3. The method of claim 1, wherein the step of scanning the geographic area of interest is for detecting all electromagnetic energy emissions being emitted by a plurality of objects.

4. The method of claim 1 wherein a range of signals is predetermined and filtered out such that only those signals falling within said range are further analyzed.

5. A method for determining a location of an object of interest located at one of a plurality of locations in a geographical area of interest, said method comprising the steps of:
    partitioning the geographical area of interest into a plurality of tiles having a predetermined size;
    scanning the geographical area of interest by at least one receiving device having an antenna for detecting all or a plurality of electromagnetic energy signal emissions being emitted from each of the plurality of tiles;
    performing a high order statistical analysis by a statistical analyzer on said detected electromagnetic energy signal emissions, wherein said high order statistical analysis is configured to measure a Gaussian level of each of said electromagnetic energy signal emissions being emitted from each of the plurality of tiles; and
    determining from said plurality of tiles at least one tile having a less Gaussian level amongst the Gaussian levels of each said electromagnetic energy signal emission being emitted from each of the plurality of tiles as being the location of the object of interest.

6. The method of claim 5, wherein the step of performing a high order statistical analysis comprises measuring the entropy for the electromagnetic energy signal emissions emitted from the plurality of tiles.

7. The method of claim 5, wherein the step of scanning the geographic area of interest is for detecting all electromagnetic energy emissions being emitted by a plurality of objects.

8. The method of claim 5 wherein the step of scanning the geographic area of interest is for detecting a plurality of electromagnetic energy emissions being emitted.

9. The method of claim 8 wherein a range of signals is predetermined and filtered out such that only those signals falling within said range are further analyzed.

10. The method of claim 5 wherein tracking resolution is improved by increasing the number of tiles used.

11. The method of claim 5 wherein the location of the object of interest is determined by ascertaining in which of said tiles the object of interest is located.

12. The method of claim 11, wherein the scanning step is repeated one or more times and the object of interest is tracked by comparing the position of the object of interest during said one or more repeated scanning steps.

13. A method for tracking location of an object of interest located in a geographical area of interest, said method comprising the steps of:
    partitioning the geographical area of interest into a plurality of tiles having a predetermined size;
    scanning the geographical area of interest in a time sequence by at least one receiving device having an antenna for detecting all electromagnetic energy signal emissions being emitted from each of the plurality of tiles at a particular time;
    performing high order statistical analysis by a statistical analyzer to measure a Gaussian level of each of said electromagnetic energy signal emissions being emitted from each of the plurality of tiles at a particular time; and
    tracking the object of interest by progressively determining from the plurality of tiles at least one tile having a less Gaussian level amongst the Gaussian levels of each said electromagnetic energy signal emission being emitted from each of the plurality of tiles.

14. The method of claim 13, wherein the step of tracking the object of interest is carried out by selecting a relatively contiguous time sequenced ensemble of tiles which in aggregate exhibit the least Gaussian level over the area of interest and over an interval of time.

15. The method of claim 13, wherein the step of performing a high order statistical analysis comprises measuring the entropy for the electromagnetic energy signal emissions emitted from the plurality of tiles.

\* \* \* \* \*